(12) United States Patent
Matthews et al.

(10) Patent No.: US 9,894,670 B1
(45) Date of Patent: Feb. 13, 2018

(54) IMPLEMENTING ADAPTIVE RESOURCE ALLOCATION FOR NETWORK DEVICES

(71) Applicant: Innovium, Inc., San Jose, CA (US)

(72) Inventors: William Brad Matthews, San Jose, CA (US); Puneet Agarwal, Cupertino, CA (US); Bruce H. Kwan, Sunnyvale, CA (US); Ashwin Alapati, Sunnyvale, CA (US); William Fan, San Francisco, CA (US); Ajit K. Jain, Cupertino, CA (US)

(73) Assignee: Innovium, Inc., San Jose, CA (US)

( * ) Notice: Subject to any disclaimer, the term of this patent is extended or adjusted under 35 U.S.C. 154(b) by 63 days.

(21) Appl. No.: 14/973,484

(22) Filed: Dec. 17, 2015

(51) Int. Cl.
*H04J 3/00* (2006.01)
*H04W 72/10* (2009.01)
*H04W 72/04* (2009.01)

(52) U.S. Cl.
CPC ....... *H04W 72/10* (2013.01); *H04W 72/0446* (2013.01)

(58) Field of Classification Search
CPC .................................. H04W 72/0446
USPC ....................................... 370/336
See application file for complete search history.

(56) References Cited

U.S. PATENT DOCUMENTS

| | | | | |
|---|---|---|---|---|
| 7,137,119 B1* | 11/2006 | Sankaranarayan | ... | G06F 9/5011 718/103 |
| 7,590,736 B2* | 9/2009 | Hydrie | ................... | H04L 29/06 709/226 |
| 7,636,917 B2* | 12/2009 | Darling | ................... | H04L 29/06 709/223 |
| 8,203,942 B2* | 6/2012 | Hernandez | ............ | H04L 47/125 370/230 |
| 8,909,220 B1* | 12/2014 | Aftahi | ................... | H04W 84/06 370/316 |
| 2002/0120741 A1* | 8/2002 | Webb | .................. | G06F 11/3093 709/225 |
| 2003/0069974 A1* | 4/2003 | Lu | ........................... | G06F 9/505 709/226 |
| 2003/0153994 A1* | 8/2003 | Jin | ......................... | G06Q 10/10 700/99 |
| 2005/0055694 A1* | 3/2005 | Lee | ....................... | G06F 9/5083 718/100 |
| 2005/0216663 A1* | 9/2005 | Fujibayashi | .......... | G06F 3/0607 711/114 |
| 2010/0118769 A1* | 5/2010 | Agarwal | ............ | H04B 7/18578 370/321 |
| 2014/0155080 A1* | 6/2014 | Austin | .................. | H04W 28/08 455/453 |

\* cited by examiner

*Primary Examiner* — Guang Li
(74) *Attorney, Agent, or Firm* — Fish & Richardson P.C.

(57) ABSTRACT

A resource management system for a network device is described. A resource management system includes a resource manager configured to generate a sequence of a plurality of access time slots for a plurality of candidate entities and to redistribute access to one or more of the plurality of access time slots in the sequence based on availability and eligibility. The resource management system also includes a resource monitor configured to detect usage of each of the access time slots by each of the plurality of candidate entities.

30 Claims, 3 Drawing Sheets

| Access Time Slot | Assigned Candidate Entity |
|---|---|
| 202 ~ T0 | Candidate Entity A ~ 204 |
| 206 ~ T1 | Candidate Entity B ~ 208 |
| 210 ~ T2 | Candidate Entity A ~ 204 |
| 212 ~ T3 | Candidate Entity C ~ 214 |
| 216 ~ T4 | Candidate Entity A ~ 204 |
| 220 ~ T5 | Candidate Entity D ~ 222 |
| 224 ~ T6 | Candidate Entity A ~ 204 |

Figure 2

IMPLEMENTING ADAPTIVE RESOURCE ALLOCATION FOR NETWORK DEVICES

FIELD

Embodiments of the invention relate to network devices. In particular, embodiments of the invention relate to resource allocation for network devices.

BACKGROUND

As the demands for higher bandwidth and parallel processing increase for network devices, the demand on shared resources also grows. Shared resources may include, but are not limited to, memory, access ports, processors, processing units, devices, and other resources that are shared by one or more candidate entities requesting access to a shared resource. Current systems lack the flexibility to adapted to demands for resources based on current usage and require complex procedures to update how resources are allocated to candidate entities.

SUMMARY

A resource management system for a network device is described. A resource management system includes a resource manager configured to generate a sequence of a plurality of access time slots for a plurality of candidate entities and to redistribute access to one or more of the plurality of access time slots in the sequence based on availability. The resource management system also includes a resource monitor configured to detect usage of each of the access time slots by each of the plurality of candidate entities.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which:

FIG. 2 illustrates a sequence of a plurality of access time slots generated according to an embodiment.

DETAILED DESCRIPTION

Embodiments of a system and method for implementing resource management are described. In particular, the system includes a system includes a resource manager configured to generate a sequence of a plurality of access time slots for a plurality of candidate entities and to redistribute access to one or more of the plurality of access time slots in the sequence based on availability. The resource management system also includes a resource monitor configured to detect usage of each of the access time slots by each of the plurality of candidate entities. The system and method provide the ability to dynamically adapt to allocate access resources based on demand to optimize access to the resources by a plurality of candidate entities. Further, the system is configured to ensure a quality of service is maintained for each of the plurality of candidate entities. Thus, the system and method provide the benefit of generating a sequence-based structure, with each sequence entry bound to a candidate entity, that can be reconfigure for a subset of entries without impacting timeslot assignments for one or more entities whose sequence elements are not changed.

Figure 1:
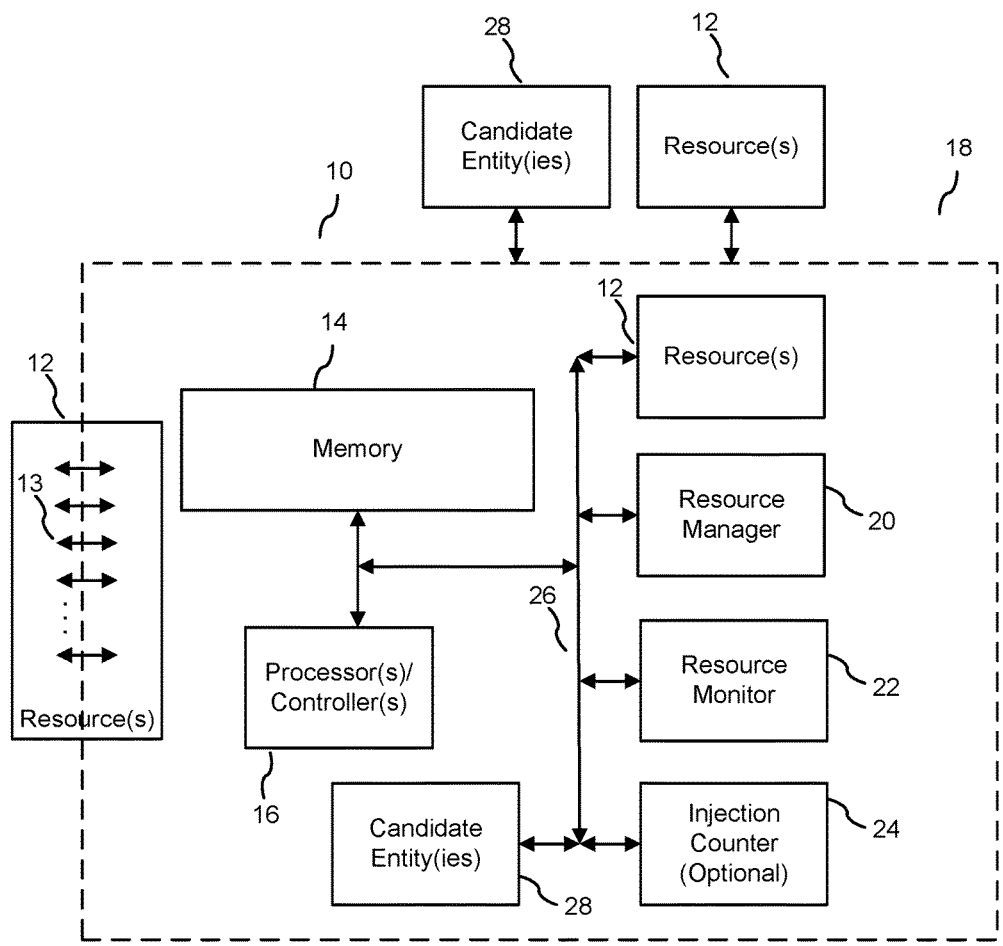
FIG. 1 illustrates a block diagram of a network device including a resource management system according to an embodiment.

FIG. 1 illustrates a block diagram of a network device including a resource management system according to an embodiment. Specifically, FIG. 1 illustrates a network device 10 including one or more resources 12. The network device 10 may also be coupled with resources that are external to the network device 10. An example of a resource includes, but is not limited to, an input/output port 13, a packet processor, memory, a pipeline, a bus, and components. A resource 12 includes internal resources to a network device 10 and external resources. The system 10 further includes a memory 14. The memory 14 includes memory technologies including, but not limited to, dynamic random-access memory ("DRAM"), static random-access memory ("SRAM"), flash memory, and other technologies used to store data including those known in the art.

Further, the network device 10 includes one or more processors 16. A processor 16 may include, but is not limited to a central processing unit ("CPU"), a controller, an application-specific integrated circuit ("ASIC"), field-programmable gate arrays ("FPGA"), and other types of control units. The network device 10 also includes a resource manager 20, a resource monitor 22, and optionally an injection counter 24. For an embodiment, the processor 16, the memory 14, resources 12, resource manager 20, resource monitor, and the injection counter 24 are coupled with each other through one or more communication interfaces 26. A communication interface includes, but is not limited to, a bus, input/output ports, and other interfaces for interconnecting components including those known in the art. Further, the one or more communication interfaces 26 interconnect one or more candidate entities 28 to the network device 10 and one or more of the resources 12. A candidate entity 28 includes, but is not limited to, a network device, a processor, a table, processing unit, memory, and other components that interact with, communicate with, or otherwise require one or more resources 12.

A resource manager 20, for an embodiment, is configured to generate a sequence of a plurality of access time slots. The access time slots provide a time period for one or more candidate entities 28 to access a resource 12. For an embodiment, a resource manager 20 is configured to generate a sequence of a plurality of access time slots based on a table. The table may include a list of candidate entities with a priority assigned to each candidate. Such a table is stored in memory 14. The resource manager 20, according to an embodiment, is configured to use the list of candidate entities and the associated priority to generate a sequence that distributes access of resources by the candidates in time. FIG. 2 illustrates a sequence generated according to an embodiment. The sequence includes access time slots T0 (202), T1 (206), T2 (210), T3 (212), T4 (216), T5 (220), and T6 (224). The sequence is generated by assigning candidate entities A 204, B 208, C 214, and D 222 to one or more access time slots 202, 206, 210, 212, 216, 220, 224. As illustrated in FIG. 2, candidate entity A is assigned to access time slots T0 (202), T2 (210), T4 (216), and T6 (224). Further, candidate entity B 208 is assigned to access time slot T1 (206), candidate entity C 214 is assigned to access time slot T3 (212), and candidate entity D 222 is assigned to access time slot T5 (220). So, each candidate entity is given access to one or more resources during the access time slot it is assigned.

For an embodiment, a resource manager is configured to assign time slots 202, 206, 210, 212, 216, 220, 224 to candidate entities based on a priority. For example, a candidate entity may be assigned a priority higher than the other candidate entities. This higher priority candidate entity is assigned a greater number of access time slots 202, 206, 210, 212, 216, 220, 224 than those candidate entities having a lower priority. Thus, the one or more higher priority candidate entities are given more access time slots in a sequence than those of a lower priority. In the example illustrated in FIG. 2, candidate entity A 204 has a higher priority than candidate entity B 208, candidate entity C 214, and candidate entity D 222. For an example, a priority is assigned to a candidate entity to ensure that the candidate entity obtains a minimum data rate and/or minimum level of service.

Figure 3:
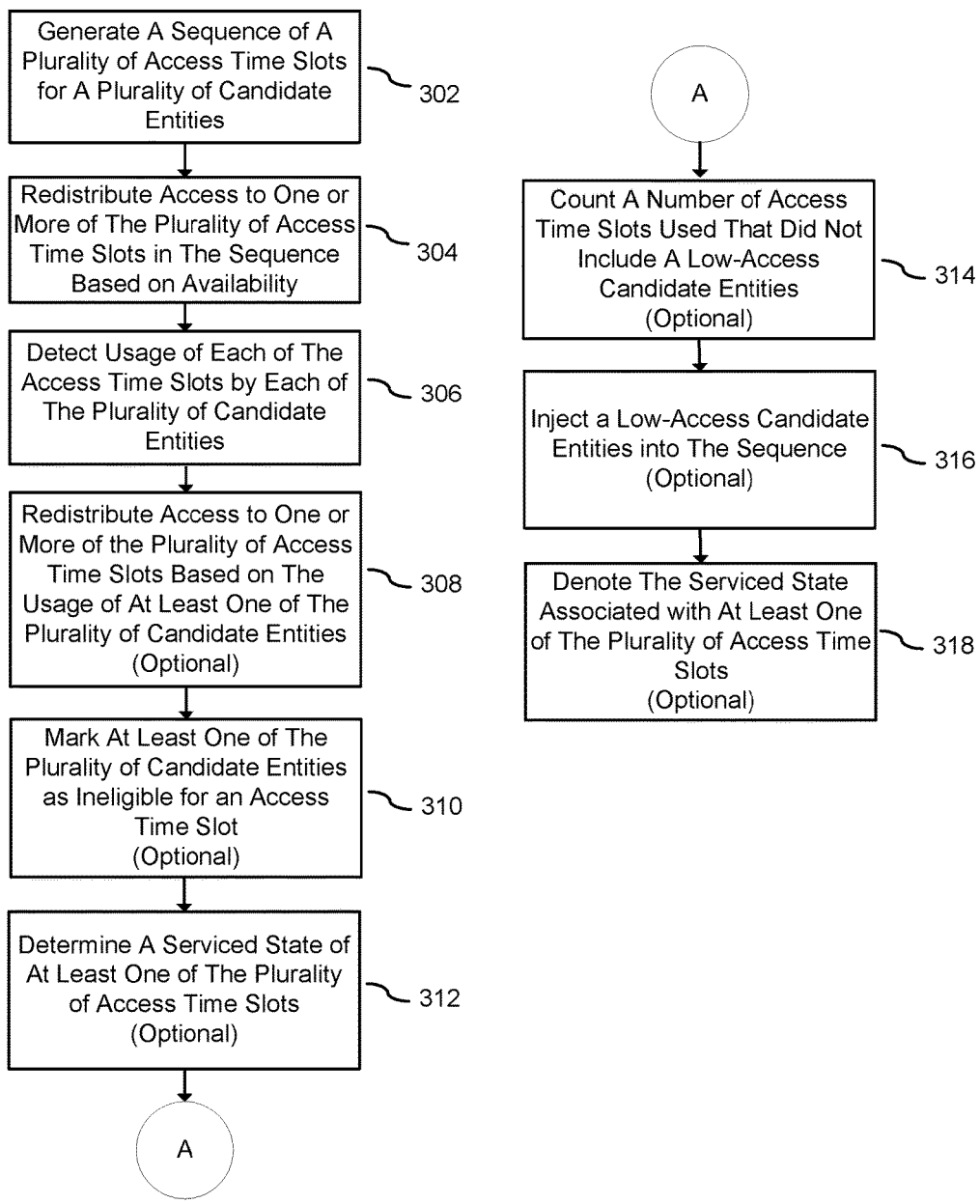
FIG. 3 illustrates a flow diagram for a method for implementing resource management according to an embodiment.

The resource manager 20, as illustrated in FIG. 3, is also configured to redistribute access of one or more of the access time slots in the sequence to one of the candidate entities that are not assigned to that access time slot. For example, if a candidate entity that is assigned to a time slot does not request the use of the access time slot, the resource manager 20 is configured to redistribute access to that access time slot to one of the candidate entities that have a request for an access time slot pending. A candidate entity is configured to request access to an access time slot using techniques including, but not limited to, transmitting a request packet, activating a request line on a bus, setting a value in a register, and other techniques including those known in the art for requesting access to a resource.

For an embodiment, the resource manager 20 is configured to optionally search forward in the sequence. For example, a resource manager 20 searches forward in the sequence when the candidate assigned for the access time slot has not indicated a request for that time slot or is restricted from access in that time slot. So, for the exemplary sequence illustrated in FIG. 2, if the resource manager does not receive a request or other confirmation that candidate entity A 204 needs access to a resource during access time slot T2 (210), the resource manager is configured to search forward to the next access time slot in the sequence that a request for the access time slot has been received, such as T3 (212). Thus, the resource manager is configured to not wait the full time period of T2 (210) to pass before moving to the next access time that a candidate entity is confirmed to use by way of a request.

Further, resource monitor 22, as illustrated in FIG. 1, is configured to detect the usage of one or more resources by each of the candidate entities. For example, the resource monitor 22 is configured to detect the amount of access time slots a device candidate used over a time period. A time period may include several iterations of the sequence. As describe above, a device candidate may have access to more time access slots than are assigned for it in a sequence through redistribution and shifting the time sequence forward in time. In such an example, the resource monitor 22 is configured to determine if one or more device candidates had access to more access time slots during the time period. The resource monitor 20 is configured to mark a candidate entity ineligible for one or more access time slots based on a determination that the candidate entity has exceeded a limit for the time period. The limit may be determined empirically, statistically, or using other techniques known in the art. According to an embodiment, a resource monitor 22 is configured to mark a candidate entity ineligible by transmitting a notice of ineligibility to the resource manager 20, setting a flag, writing to a register, or using other communication techniques as known in the art.

The resource monitor 22, for an embodiment, is configured to detect the amount of a resource that a candidate entity uses during its one or more assigned access time slots over a time period. For example, the resource monitor 22 is configured to detect the bytes transmitted over a time period. If the resource monitor 22 detects a usage over a limit, the resource monitor is configured to mark the candidate entity ineligible for one or more access time slots using techniques including those describe herein. For an embodiment, the resource monitor 22 is configured to use a weighted moving average of the usage of the one or more candidate entities to detect the usage of the one or more candidate entities over a time period. The resource monitor 22, according to an embodiment, is configured to mark a low-access candidate as ineligible for a window of time after a last access to the sequence. For example, the resource monitor 22 is configured to restrict successive accesses to a sequence within a configured window of time, such that if access to the sequence is provided to a candidate entity at a time t then the same candidate entity is restricted from access until t+n, where n in the window of time.

As illustrated in FIG. 1, the network device 10 optionally includes an injection counter 24. An injection counter 24 is configured to inject a low-access candidate entity into a generated sequence. For example, a candidate entity may be given a low priority based on irregular or infrequent usage of one or more resources. Such a candidate entity is an example of a low-access candidate entity. Low-access candidates, according to an embodiment, are not assigned to a generated sequence. Instead, an injection counter 24 is configured to determine when to provide the low-access candidate entity access to the one or more resources by counting the number of sequence iterations, the number of access time slots since the a low-access candidate entity had access to the one or more resources, or another metric. When an injection counter 24 determines that a count is met or exceeded, the injection counter is configured to request injection of a low-access candidate into the sequence. For example, the injection counter is configured to request an access time slot using techniques including those described herein.

The resource manager 20 is configured to receive a request for an access time slot for a low-access candidate entity from an injection counter. In response to the request, the resource manager 20 is configured to inject the low-access candidate entity into the sequence by marking the next candidate entity ineligible for the next access time slot in the sequence and by providing the low-access candidate entity access during that access time slot. Alternatively, the resource manager 20 is configured to inject the low-access candidate into the sequence by providing the low-access candidate entity access to an access time slot that is available, which is determined based on the assigned candidate for the access time slot not requesting the access time slot or otherwise confirming use and eligibility of the access time slot. For an embodiment, the resource manager 20 is configured to use both techniques for injecting a low-access candidate entity into a sequence.

For an embodiment, the network system 10 is configured to provide access to one or more low-access candidate entities without using an injection counter 24. For such an embodiment, the resource manager 20 receives a request for an access time slot from the low-access candidate entity and the resource manager 20 provides an access time slot to the low-access candidate using techniques including those described herein.

For an embodiment, a resource manager is configured to generate a sequence of a plurality of elements using techniques including those described herein. In such an embodiment, each element does not necessarily correspond with a time. A resource manager 20 is configured to select sequence elements for the sequence, where each sequence element points to a candidate entity. A resource manager 20 is configured to select a sequence element, according to an embodiment, by finding the first available sequence element whose candidate entity is both available, eligible, and the sequence element has not been serviced. For an embodiment, a resource manager 20 is configured to determine if a sequence element has been serviced by denoting a serviced state associated with each sequence element. According to an embodiment, a resource manager 20 is configured to denote a serviced state associated with a sequence element by setting a flag, writing to a register, or using other communication techniques as known in the art. For an embodiment, as sequence elements are selected, a resource monitor 20 is configured to update the serviced state to indicate the element has been selected or serviced. Additionally, in searching forward for an element using techniques including those described herein, any sequence element whose candidate entity is not available is marked as serviced. Moreover, a resource manager 20, according to an embodiment, is configured to move a first element of a sequence to the end of the sequence if it is marked as serviced. During this move from the front of the sequence to the end of the sequence, a resource manager 20 is further configured to clear the serviced state of the first element to indicate the sequence element has not been serviced.

FIG. 3 illustrates a flow diagram for a method for implementing resource management according to an embodiment. The method includes generating a sequence of a plurality access time slots for a plurality of candidate entities 302. The sequence is generated using techniques including those described herein. The method also includes redistributing access to one or more of the plurality of access time slots in the sequence based on availability 304. The access to the one or more of the plurality of access time slots in the sequence are redistributed using techniques including those described herein. Further, the method includes detecting usage of each of the access time slots by each of the plurality of candidate entities 306. The usage of each of the access time slots by each of the plurality of candidate entities is detected using techniques including those described herein.

The method optionally includes redistributing access to one or more of the plurality of access time slots based on the usage of at least one of the plurality of candidate entities 308. Redistributing access to one or more of the plurality of access time slots based on the usage of at least one of the plurality of candidate entities is implemented using techniques including those described herein. Moreover, the method optionally includes marking at least one of the plurality of candidate entities as ineligible for an access time slot 310. Marking at least one of the plurality of candidate entities as ineligible for an access time slot is implemented using techniques including those described herein. The method also optionally includes determining a serviced state of at least one of the plurality of access time slots 312 using techniques including those described herein, for example with regards to sequence elements. The method also optionally includes counting a number of access time slots used that did not include a low-access candidate entity 314 using techniques including those described herein. Further, the method optionally includes injecting a low-access candidate entity into the sequence 316. Injecting a low-access candidate entity into the sequence is implemented using techniques including those described herein. Further, the method optionally includes denoting a serviced state associated with at least one of the plurality of access time slots 318 using techniques including those described herein, for example with regards to sequence elements.

Embodiments described herein may be implemented using one or more of a semiconductor chip, ASIC, FPGA, and using discrete components. Moreover, elements of the memory system may be implemented as one or more cores on a semiconductor chip, such as a system on a chip ("SoC"). Embodiments described herein may also be implemented on a machine, such as a network device and one or more computer systems, including a program storage device. The program storage device includes, but is not limited to, one or more of any of mass storage that is remotely located from the machine, random access memory, non-volatile memory, magnetic or optical storage disks, and other computer readable storage mediums.

In the foregoing specification, specific exemplary embodiments of the invention have been described. It will, however, be evident that various modifications and changes may be made thereto. The specification and drawings are, accordingly, to be regarded in an illustrative rather than a restrictive sense.

What is claimed is:

1. A resource management system for a network device comprising:
 a resource manager that is configured to:
 generate a sequence of a plurality of access time slots for a plurality of candidate entities to access a plurality of resources associated with the network device,
  wherein a candidate entity of the plurality of candidate entities is a network entity that requests access to one or more of the plurality of resources, and
  wherein an access time slot provides a time period during which a candidate entity associated with the access time slot can access a resource of the plurality of resources;
 determine a priority level associated with each of the plurality of candidate entities, wherein each of the candidate entities is associated with a respective one of a predetermined plurality of priority levels, including:
  determining a first priority level for a first candidate entity of the of the plurality of candidate entities, and
  determining a second priority level for a second candidate entity of the of the plurality of candidate entities, wherein the second priority level is lower than the first priority level;
 in response to determining that the first candidate entity has the first priority level that is higher than the second priority level of the second candidate entity, assign a greater number of access time slots to the first candidate entity, and a lower number of access time slots to the second candidate entity;
 determine that at least one of the first candidate entity or the second candidate entity is not using one or more access time slots assigned to the respective candidate entity; and
 in response to determining that at least one of the first candidate entity or the second candidate entity is not using one or more access time slots assigned to the respective candidate entity, redistribute an unused access time slot presently assigned to one of the first candidate entity or the second candidate entity to a third candidate entity that is without any assigned access time slot; and a resource monitor that is configured to detect usage of each of the access time slots by the respective candidate entities that are assigned the access time slots.

2. The resource management system of claim 1, wherein the resource manager is configured to generate the sequence based on a table stored in memory, wherein the table includes a list of candidate entities with a priority level assigned to each candidate entity.

3. The resource management system of claim 1, wherein the resource manager is configured to assign a number of access time slots of the plurality of access time slots to a candidate entity to achieve a minimum data rate.

4. The resource management system of claim 1, wherein the resource manager is configured to redistribute access to one or more of the plurality of access time slots in the sequence based on availability and eligibility by searching forward in the sequence to an access time slot of the plurality of access time slots that an assigned candidate entity of the plurality of candidate entities for the access time slot has not indicated a request for the access time slot.

5. The resource management system of claim 4, wherein the resource manager is configured to denote a serviced state of one or more of the plurality of access time slots in the sequence,
wherein a serviced state of an access time slot indicates whether the access time slot has been used by the respective candidate entity that is assigned to the access time slot.

6. The resource management system of claim 1, wherein the resource monitor is further configured to:
detect that at least one of the plurality of candidate entities has consumed a resource above a threshold over a time period; and
in response to the detection, mark the at least one of the plurality of candidate entities as ineligible for an access time slot.

7. The resource management system of claim 1, wherein the resource monitor is configured to detect usage of each of the access time slots by each of the plurality of candidate entities over a time period.

8. The resource management system of claim 1, wherein the resource monitor is configured to detect usage of each of the access time slots by each of the plurality of candidate entities as a weighted moving average.

9. The resource management system of claim 1, wherein the third candidate entity is a low-access candidate entity, wherein a low-access candidate entity is a candidate entity of the plurality of candidate entities that is not originally assigned any access time slot in the sequence.

10. The resource management system of claim 9, wherein the third priority level is the lowest of all priority levels, and wherein the resource manager is configured to:
determine that the third candidate entity has used one or more resources infrequently; and
in response to determining that the third candidate entity has used one or more resources infrequently, associating the third candidate entity with the third priority level; and
upon determining the third priority level is associated with the third candidate entity, avoid an original assignment of an access time slot to the third candidate entity in the sequence.

11. The resource management system of claim 9, further comprising an injection counter that is configured to count how many access time slots used that are not assigned to the low-access candidate entity.

12. The resource management system of claim 11, wherein redistributing the unused access time slot to the third candidate entity comprises:
receiving, from the injection counter, a request for an access time slot for the third candidate entity.

13. The resource management system of claim 11, wherein the resource monitor is configured to assign an access time slot to the low-access candidate entity based on a count of the injection counter.

14. The resource management system of claim 9, wherein the resource monitor is configured to mark the low-access candidate entity as ineligible for a window of time after a last use of an access time slot in the sequence that is assigned to the low-access candidate entity.

15. The resource management system of claim 1, wherein the plurality of resources includes one or more of an input/output port, a packet processor, memory, a pipeline, or a bus, and
wherein the plurality of candidate entities includes one or more of a second network device, a processing unit, a memory, or a table.

16. A method for implementing resource management in a network device comprising:
generating a sequence of a plurality of access time slots for a plurality of candidate entities to access a plurality of resources associated with the network device,
wherein a candidate entity of the plurality of candidate entities is a network entity that requests access to one or more of the plurality of resources, and
wherein an access time slot provides a time period during which a candidate entity associated with the access time slot can access a resource of the plurality of resources;
determining a priority level associated with each of the plurality of candidate entities, wherein each of the candidate entities is associated with a respective one of a predetermined plurality of priority levels, including:
determining a first priority level for a first candidate entity of the of the plurality of candidate entities, and
determining a second priority level for a second candidate entity of the of the plurality of candidate entities, wherein the second priority level is lower than the first priority level;
in response to determining that the first candidate entity has the first priority level that is higher than the second priority level of the second candidate entity, assigning a greater number of access time slots to the first candidate entity, and a lower number of access time slots to the second candidate entity;
determining that at least one of the first candidate entity or the second candidate entity is not using one or more access time slots assigned to the respective candidate entity; and
in response to determining that at least one of the first candidate entity or the second candidate entity is not using one or more access time slots assigned to the respective candidate entity, redistributing an unused access time slot presently assigned to one of the first candidate entity or the second candidate entity to a third candidate entity that is without any assigned access time slot; and detecting usage of each of the access time slots by the respective candidate entities that are assigned the access time slots.

17. The method of claim 16, wherein generating the sequence includes generating the sequence based on a table stored in memory, wherein the table includes a list of candidate entities with a priority level assigned to each candidate entity.

18. The method of claim 16, wherein generating the sequence of the plurality of access time slots comprises:
assigning a number of access time slots of the plurality of access time slots to a candidate entity to achieve a minimum data rate.

19. The method of claim 16, further comprising:
detect that at least one of the plurality of candidate entities has consumed a resource above a threshold over a time period; and
in response to the detection, marking at least one of the plurality of candidate entities as ineligible for an access time slot based on the usage.

20. The method of claim 16, wherein detecting usage of each of the access time slots comprises:
detecting usage of each of the access time slots by each of the plurality of candidate entities over a time period.

21. The method claim 16, wherein detecting usage of each of the access time slots comprises:
detecting usage of each of the access time slots by each of the plurality of candidate entities as a weighted moving average.

22. The method of claim 16, wherein the third candidate entity is a low-access candidate entity, wherein a low-access candidate entity is a candidate entity of the plurality of candidate entities that is not originally assigned any access time slot in the sequence.

23. The method of claim 22, further comprising:
counting how many access time slots used are not assigned to the low-access candidate entity.

24. The method of claim 22, wherein assigning an access time slot to the low-access candidate entity is based on a count.

25. The method of claim 22, wherein the third priority level is the lowest of all priority levels, the method further comprising:
determining that the third candidate entity has used one or more resources infrequently; and
in response to determining that the third candidate entity has used one or more resources infrequently:
associating the third priority level with the third candidate entity, and
upon associating the third priority level for the third candidate entity, avoiding an original assignment of an access time slot to the third candidate entity in the sequence.

26. The method of claim 22, further comprising:
marking the low-access candidate entity as ineligible for a window of time after a last use of an access time slot in the sequence that is assigned to the low-access candidate entity.

27. The method of claim 16, wherein redistributing access to one or more of the plurality of access time slots in the sequence includes searching forward in the sequence to an access time slot of the plurality of access time slots that an assigned candidate entity of the plurality of candidate entities for the access time slot has not indicated a request for the access time slot.

28. The method of claim 27, further comprising denoting a serviced state of one or more of the plurality of access time slots in the sequence,
wherein a serviced state of an access time slot indicates whether the access time slot has been used by the respective candidate entity that is assigned to the access time slot.

29. An apparatus comprising:
a means for generating a sequence of a plurality of access time slots for a plurality of candidate entities to access a plurality of resources,
wherein a candidate entity of the plurality of candidate entities is a network entity that requests access to one or more of the plurality of resources, and
wherein an access time slot provides a time period during which a candidate entity associated with the access time slot can access a resource of the plurality of resources;
a means for redistributing access to one or more of the plurality of access time slots in the sequence based on availability and eligibility, comprising:
determining a priority level associated with each of the plurality of candidate entities, wherein each of the candidate entities is associated with a respective one of a predetermined plurality of priority levels, including:
determining a first priority level for a first candidate entity of the of the plurality of candidate entities, and
determining a second priority level for a second candidate entity of the of the plurality of candidate entities, wherein the second priority level is lower than the first priority level;
in response to determining that the first candidate entity has the first priority level that is higher than the second priority level of the second candidate entity, assigning a greater number of access time slots to the first candidate entity, and a lower number of access time slots to the second candidate entity;
determining that at least one of the first candidate entity or the second candidate entity is not using one or more access time slots assigned to the respective candidate entity; and
in response to determining that at least one of the first candidate entity or the second candidate entity is not using one or more access time slots assigned to the respective candidate entity, redistributing an unused access time slot presently assigned to one of the first candidate entity or the second candidate entity to a third candidate entity that is without any assigned access time slot; and
a means for detecting usage of each of the access time slots the respective candidate entities that are assigned the access time slots.

30. A non-transitory program storage device readable by a machine, embodying a program of instructions executable by the machine to perform operations comprising:
generating a sequence of a plurality of access time slots for a plurality of candidate entities to access a plurality of resources,
wherein a candidate entity of the plurality of candidate entities is a network entity that requests access to one or more of the plurality of resources, and
wherein an access time slot provides a time period during which a candidate entity associated with the access time slot can access a resource of the plurality of resources;

determining a priority level associated with each of the plurality of candidate entities, wherein each of the candidate entities is associated with a respective one of a predetermined plurality of priority levels, including:
  determining a first priority level for a first candidate entity of the of the plurality of candidate entities, and
  determining a second priority level for a second candidate entity of the of the plurality of candidate entities, wherein the second priority level is lower than the first priority level;
in response to determining that the first candidate entity has the first priority level that is higher than the second priority level of the second candidate entity, assigning a greater number of access time slots to the first candidate entity, and a lower number of access time slots to the second candidate entity;
determining that at least one of the first candidate entity or the second candidate entity is not using one or more access time slots assigned to the respective candidate entity; and
in response to determining that at least one of the first candidate entity or the second candidate entity is not using one or more access time slots assigned to the respective candidate entity, redistributing an unused access time slot presently assigned to one of the first candidate entity or the second candidate entity to a third candidate entity that is without any assigned access time slot; and
detecting usage of each of the access time slots by the respective candidate entities that are assigned the access time slots.

* * * * *

UNITED STATES PATENT AND TRADEMARK OFFICE
CERTIFICATE OF CORRECTION

PATENT NO. : 9,894,670 B1
APPLICATION NO. : 14/973484
DATED : February 13, 2018
INVENTOR(S) : William Brad Matthews et al.

Page 1 of 1

It is certified that error appears in the above-identified patent and that said Letters Patent is hereby corrected as shown below:

In the Claims

In Claim 1, Column 6, Line 48, after "entity" delete "of the".

In Claim 1, Column 6, Line 50, after "entity" delete "of the".

In Claim 16, Column 8, Line 45, after "entity" delete "of the".

In Claim 16, Column 8, Line 47, after "entity" delete "of the".

In Claim 29, Column 10, Line 28, after "entity" delete "of the".

In Claim 29, Column 10, Line 31, after "entity" delete "of the".

In Claim 30, Column 11, Line 6, after "entity" delete "of the".

In Claim 30, Column 11, Line 8, after "entity" delete "of the".

Signed and Sealed this
Seventeenth Day of April, 2018

Andrei Iancu
*Director of the United States Patent and Trademark Office*